(12) United States Patent
Larsen

(10) Patent No.: US 7,878,192 B2
(45) Date of Patent: Feb. 1, 2011

(54) ADJUSTABLE SOLAR COLLECTOR AND METHOD OF USE

(76) Inventor: Theodore Edward Larsen, 5800 St. Croix Ave., Minneapolis, MN (US) 55422

( * ) Notice: Subject to any disclaimer, the term of this patent is extended or adjusted under 35 U.S.C. 154(b) by 453 days.

(21) Appl. No.: 11/986,417

(22) Filed: Nov. 21, 2007

(65) Prior Publication Data
US 2008/0163864 A1 Jul. 10, 2008

Related U.S. Application Data

(60) Provisional application No. 60/860,623, filed on Nov. 22, 2006.

(51) Int. Cl.
*F24J 2/10* (2006.01)
*F24J 2/12* (2006.01)

(52) U.S. Cl. ............ 126/696; 126/692; 126/694; 126/714; 126/903; 359/852

(58) Field of Classification Search ......... 126/573, 126/593, 600, 570, 571, 684, 692, 694, 696, 126/714, 710, 703, 624, 627; 359/838, 883, 359/852, 853, 862, 865, 872, 876
See application file for complete search history.

(56) References Cited

U.S. PATENT DOCUMENTS

| | | | | |
|---|---|---|---|---|
| 3,968,786 A | * | 7/1976 | Spielberg | 126/676 |
| 4,002,499 A | * | 1/1977 | Winston | 136/206 |
| 4,048,983 A | * | 9/1977 | Pei | 126/676 |
| 4,099,515 A | | 7/1978 | Schertz | |
| 4,159,712 A | * | 7/1979 | Legg | 126/584 |
| 4,161,942 A | * | 7/1979 | Monk | 126/576 |
| 4,202,322 A | * | 5/1980 | Delgado et al. | 126/574 |
| 4,211,212 A | * | 7/1980 | Braun | 126/607 |
| 4,243,019 A | | 1/1981 | Severson | |
| 4,265,223 A | * | 5/1981 | Miserlis et al. | 126/592 |
| 4,296,737 A | | 10/1981 | Silk | |
| 4,313,422 A | | 2/1982 | McEntee | |
| 4,324,229 A | * | 4/1982 | Risser | 126/603 |
| 4,399,919 A | * | 8/1983 | Posnansky et al. | 215/12.2 |
| 4,423,719 A | | 1/1984 | Hutchison | |
| 4,493,313 A | | 1/1985 | Eaton | |
| 4,546,757 A | | 10/1985 | Jakahi | |
| 5,177,977 A | * | 1/1993 | Larsen | 62/235.1 |
| 5,404,868 A | * | 4/1995 | Sankrithi | 126/604 |
| 5,497,762 A | * | 3/1996 | Rylewski | 126/702 |
| 5,537,991 A | * | 7/1996 | Winston et al. | 126/657 |
| 6,244,264 B1 | * | 6/2001 | Winston | 126/652 |

(Continued)

FOREIGN PATENT DOCUMENTS

JP 58148331 A * 9/1983

*Primary Examiner*—Carl D Price
(74) *Attorney, Agent, or Firm*—Patterson Thuente Christensen Pedersen, P.A.

(57) ABSTRACT

A solar collector has operably connected reflective panels that can be positioned to substantially form a parabolic trough that concentrates solar radiation onto a tube running along the focal line of the trough. A folding mechanism can be manually or automatically operated to selectively fold and unfold the panels into open and closed positions and into any number of intermediate positions, including the position characterized by formation of a parabolic trough. A rotating mechanism can be manually or automatically operated to selectively rotate the solar collector about an axis parallel to the focus line of the parabolic trough.

21 Claims, 17 Drawing Sheets

U.S. PATENT DOCUMENTS

| | | |
|---|---|---|
| 6,276,359 B1 | 8/2001 | Frazier |
| 6,363,928 B1 * | 4/2002 | Anderson, Jr. .............. 126/577 |
| 6,832,608 B2 | 12/2004 | Barkai et al. |
| 6,886,339 B2 | 5/2005 | Carroll et al. |
| 7,055,519 B2 | 6/2006 | Litwin |
| 2007/0034207 A1 | 2/2007 | Niedermeyer |
| 2007/0223096 A1 | 9/2007 | O'Connor et al. |
| 2007/0240704 A1 | 10/2007 | Prueitt |

* cited by examiner

Fig. 2
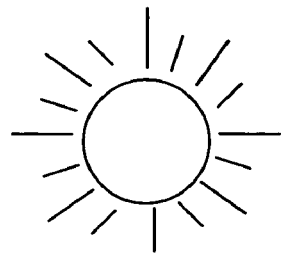
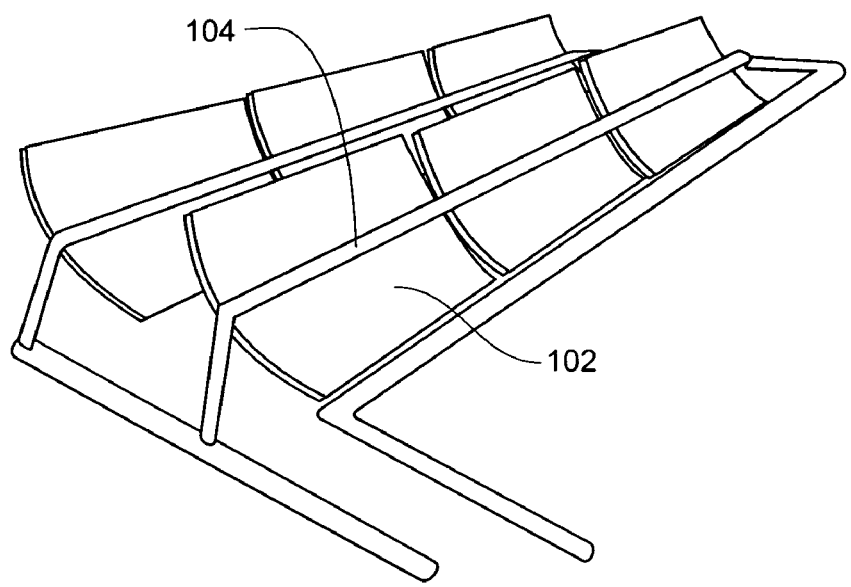

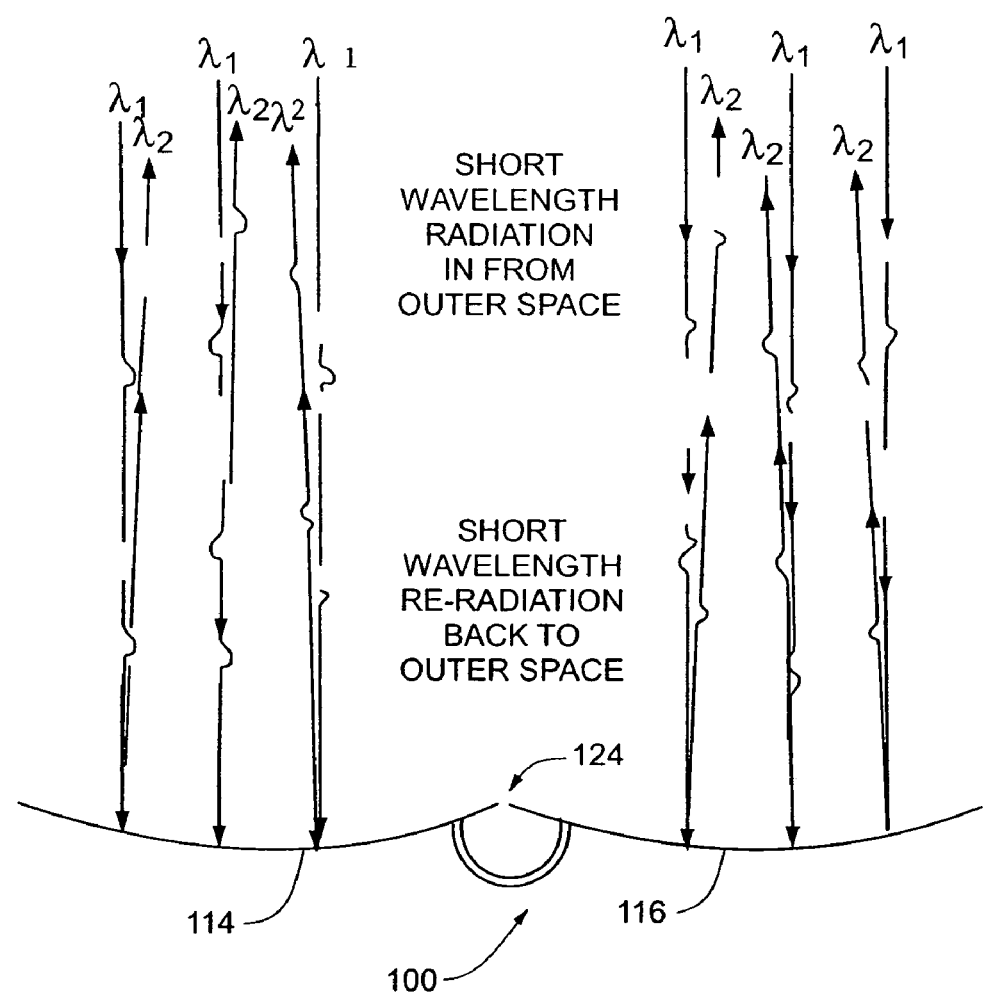

ADJUSTABLE SOLAR COLLECTOR AND METHOD OF USE

RELATED APPLICATIONS

The present application claims the benefit of U.S. Provisional Application No. 60/860,623, entitled ADJUSTABLE SOLAR COLLECTOR AND METHOD OF USE, filed Nov. 22, 2006, hereby fully incorporated herein by reference.

FIELD OF THE INVENTION

The present invention relates generally to solar energy collection devices, and more specifically, to parabolic trough solar collectors.

BACKGROUND OF THE INVENTION

With increases in the cost of fossil fuels and a rise in public awareness of the environmental consequences of current fuel consumption habits, the demand for alternative, renewable energy sources is growing. One such renewable energy source is solar energy. It is estimated that approximately 99.9% of harvestable renewable energy is solar-based, which includes resources such as wind, wave power, hydroelectricity, biomass, and solar power.

To be useful, solar energy must be converted into a usable form. In most instances, solar energy is converted into electricity. A number of devices and methods are known for converting solar energy into electricity. These technologies can generally be characterized as active or passive and as direct or indirect solar energy-conversion systems. Active systems typically rely upon electrical and mechanical components to capture short-wavelength radiation in the form of sunlight and convert it into a usable form. Passive systems rely upon non-mechanical techniques to control the capture of sunlight and convert this energy into a usable form. Passive techniques include referencing the position of a building to the sun to enhance energy capture, designing spaces that naturally circulate air to transfer energy, and selecting materials with favorable thermal properties to absorb and retain energy. Direct systems typically convert sunlight into a usable form of energy in a single step. Indirect systems typically convert sunlight into a usable form of energy through multiple steps.

One way to actively convert solar energy into a usable form of energy is through the use of Concentrating Solar Thermal (CST) systems. Concentrating Solar Thermal systems generally rely upon a shaped reflective surface, known as a solar collector or solar concentrator, to concentrate sunlight. Solar concentrators receive solar radiation over a relatively large surface area and focus it on a relatively small surface. More specifically, solar concentrators use lenses or mirrors to focus a large area of sunlight into a small beam or plane. Most CST systems also incorporate tracking systems that allow lenses or mirrors to follow the path of the sun. Four common types of CST systems are the solar power tower, the parabolic dish, the solar bowl, and the solar trough.

Many types of solar troughs are well-known in the art. Examples of solar troughs are described in the following issued patents and printed publications, the disclosures of which are incorporated herein by reference in their entirety: U.S. Pat. No. 4,099,515 to Schertz; U.S. Pat. No. 4,243,019 to Severson; U.S. Pat. No. 4,296,737 to Silk; U.S. Pat. No. 4,313,422 to McEntee; U.S. Pat. No. 4,423,719 to Hutchinson; U.S. Pat. No. 4,493,313 to Eaton; U.S. Pat. No. 4,546,757 to Jakahi; U.S. Pat. No. 6,276,359 to Frazier; U.S. Pat. No. 6,832,608 to Barkai, et al.; U.S. Pat. No. 6,886,339 to Carroll, et al. U.S. Pat. No. 7,055,519 to Litwin; U.S. Pub. No. 2007/0034207 to Niedermeyer; U.S. Pub. No. 2007/0223096 to O'Connor, et al., and U.S. Publication No. No. 2007/0240704 to Prueitt.

Parabolic troughs generally have a long parabolic mirror with a tube, also known as a receiver, running the length at the focal point of the mirror. The receiver is filled with a fluid, such as, for example, water or oil. To maximize the reflectivity of the trough, the top surface of the mirror is usually provided with a silver coating or polished aluminum. Due to the parabolic shape of the mirror, the trough is able to concentrate reflected sunlight onto the receiver. The concentrated sunlight heats the fluid flowing through the receiver. Depending upon the type of fluid being used and the particular design of the trough, the temperature of the fluid can exceed 400° C. When the trough is incorporated as part of a CST system, the heated fluid is transferred to a power generation system and used to generate electricity. The process can be economical and can achieve thermal efficiency in the range of approximately sixty to eighty percent.

Parabolic troughs can occupy a fixed position or be adjustable. Since the amount of reflected to the receiver is a function of the angle of the sun in relation to the trough, the position of the trough in relation to the sun greatly affects the ability of the reflective surface to concentrate sunlight onto the receiver. When the sun is at a sharp angle in relation to the trough, such as in the early morning or late afternoon, the amount of insolation, or incoming solar radiation, that can be captured by the trough can be significantly reduced. Therefore, adjustable parabolic troughs are generally more effective and are preferred in the industry. Adjustable troughs can be designed to adjust their position with respect to the sun in various ways. For example, an adjustable trough can incorporate a sun-rotating mechanism that tracks the course of the sun.

Parabolic troughs that have the ability to track the sun are generally constructed so that their axis of rotation is parallel to the path of the sun as it moves across the sky. Current technology provides for continual automatic adjustment of the troughs that is coordinated with the sun's movement. Movement of the troughs in response to the changing position of the sun is generally accomplished through adjustments along an axis perpendicular to the axis of the troughs. Though east-west or north-south orientation of the collector axis is typically specified for year-round or summer-peaking sunlight collection, respectively, troughs can be oriented in any direction. The arrangement of troughs in parallel rows simplifies system design and field layout, and minimizes interconnecting piping. Parabolic troughs can also be mounted on the ground or on a roof.

Some solar collectors also have the ability to reflect short-wavelength solar radiation back into space. For example, U.S. Pat. No. 5,177,977 discloses a parabolic trough that can be defocused so that some of the short-wavelength radiation arriving at the mirrored surface of the collector is randomly directed back into space. A drawback of this feature, however, is the difficulty of interchanging between the configuration needed to concentrate sunlight onto a receiver and the configuration needed to redirect short-wavelength radiation back into space. In addition, there is a need to increase the efficiency of the redirection of short-wavelength radiation by parabolic troughs.

Since parabolic troughs depend upon a mirrored surface to concentrate reflected sunlight, environmental conditions that may reduce the reflectivity of the mirrored surface are of great concern. For example, inclement weather, dust, and wildlife can leave unwanted deposits on the inner surface of the trough that reduces the ability of the trough to reflect sunlight. To reduce the likelihood of damage to or dirtying of the reflective inner surface, some troughs can be rotated so as to achieve an inverted position. In the inverted position, the mirrored surface can be substantially shielded from hazards such as hail, dust, and other particulate matter. A drawback of these inversion capabilities, however, is that the parabolic shape of the trough requires the trough to be elevated high above the ground (or other mounting surface) so that edges of the parabolic structure will not strike the ground (or other mounting surface) when rotated or inverted. Specifically, building a support structure that is tall enough to accommodate inversion can substantially increase burdens associated with installing and placing solar concentrators to be elevated. Existing parabolic troughs also lack an effective and efficient way to clean deposited material from the mirrored surfaces.

In addition to the mirrored surfaces of parabolic troughs, the structure of the parabolic trough as a whole can be susceptible to damage by environmental forces such as high winds. Current construction techniques for building solar concentrators generally utilize materials having a high stiffness and that are rigidly joined together to form an uninterrupted parabolic trough. While this type of construction contributes to an efficient collection of sunlight, it can also lead to catastrophic damage or fatigue that ultimately results in failure. Specifically, the parabolic face of the trough acts as a wind barrier that places tremendous strain on the solar concentrator structure during periods of high wind. A procedure for reducing wind strain on the structure is to invert the parabolic shape of the solar collector. As with protecting the solar collector from deposits on the mirrored surface, a disadvantage of inverting the parabolic shape is that the trough must be sufficiently elevated above the ground (or other mounting surface) so that edges of the parabolic structure will not strike the ground (or other mounting surface) when rotated or inverted. Even when the parabolic shape of the solar collector is inverted, pressure differentials created by the movement of air over the inverted solar collector can produce structural strain that can reduce the life expectancy of the structure. In addition, while an elevated support structure may accommodate an inverted position, the increased height further destabilizes the structure.

Therefore, there remain opportunities to further improve upon current designs. What is needed in the industry is a display mount that improves upon the aforementioned drawbacks.

SUMMARY OF THE INVENTION

The concerns described above are overcome in substantial part by the present invention. A solar collector is formed from a plurality of panels flexibly connected through a hinge mechanism operably attached on a line tangent with what is effectively the axis of the trough that can be formed by the panels. This allows the reflective surfaces to be positioned so that they form a continuous parabolic surface while also being positionable in other positions. For example, a closed position may be achieved by folding the panels together. When closed, the solar collector can be rotated to various positions. In a sideways position, the folded structure is positioned generally perpendicular to the mounting surface. In an upright position, the folded structure is positioned generally parallel to the mounting surface. The solar collector can also achieve an open position in which the panels are spread apart. Because of the parabolic shape of the sections, the closed solar collector may be oriented to present a plurality of aerodynamic surfaces. When oriented generally parallel to a wind force, the solar collector presents an upper curved surface that tends to provide an upward lift while the lower curved surface tends to provide a downward force. The generally horizontal net wind load thus applies a force on the reduced horizontal profile presented by the closed solar collector. Moreover, the vertical wind forces on the upper and lower curved surfaces of the solar collector tend to offset each other. Exemplary embodiments of the invention are explained in greater detail below.

BRIEF DESCRIPTION OF THE DRAWINGS

The embodiments of the present invention may be more completely understood in consideration of the following detailed description of various embodiments of the invention in connection with the accompanying drawings, in which:

FIG. 2 is a perspective view of a plurality of solar collectors according to a known embodiment;

FIG. 18 is cross-sectional illustration of a parabolic trough according to an embodiment of the present invention.

Figure 1:
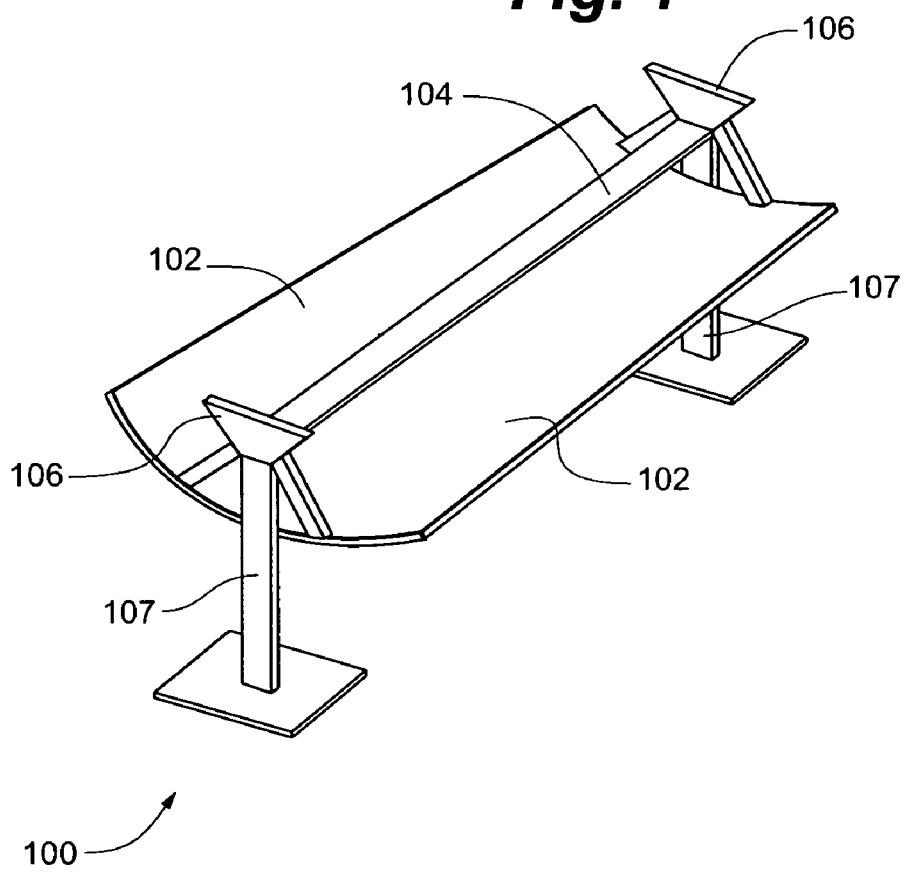
FIG. 1 is a perspective view of a solar collector according to a known embodiment.

While the present invention is amendable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention.

DETAILED DESCRIPTION OF THE DRAWINGS

Figure 3:
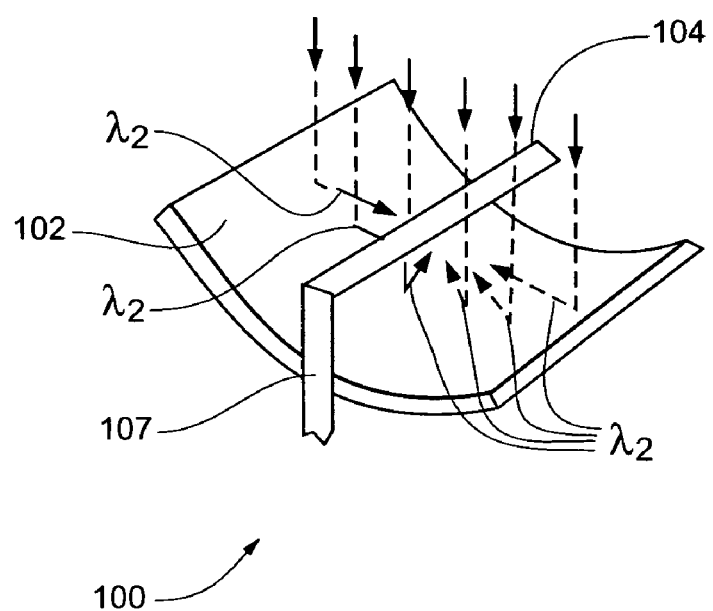
FIG. 3 is a perspective view of a solar collector according to a known embodiment.
Figure 4:
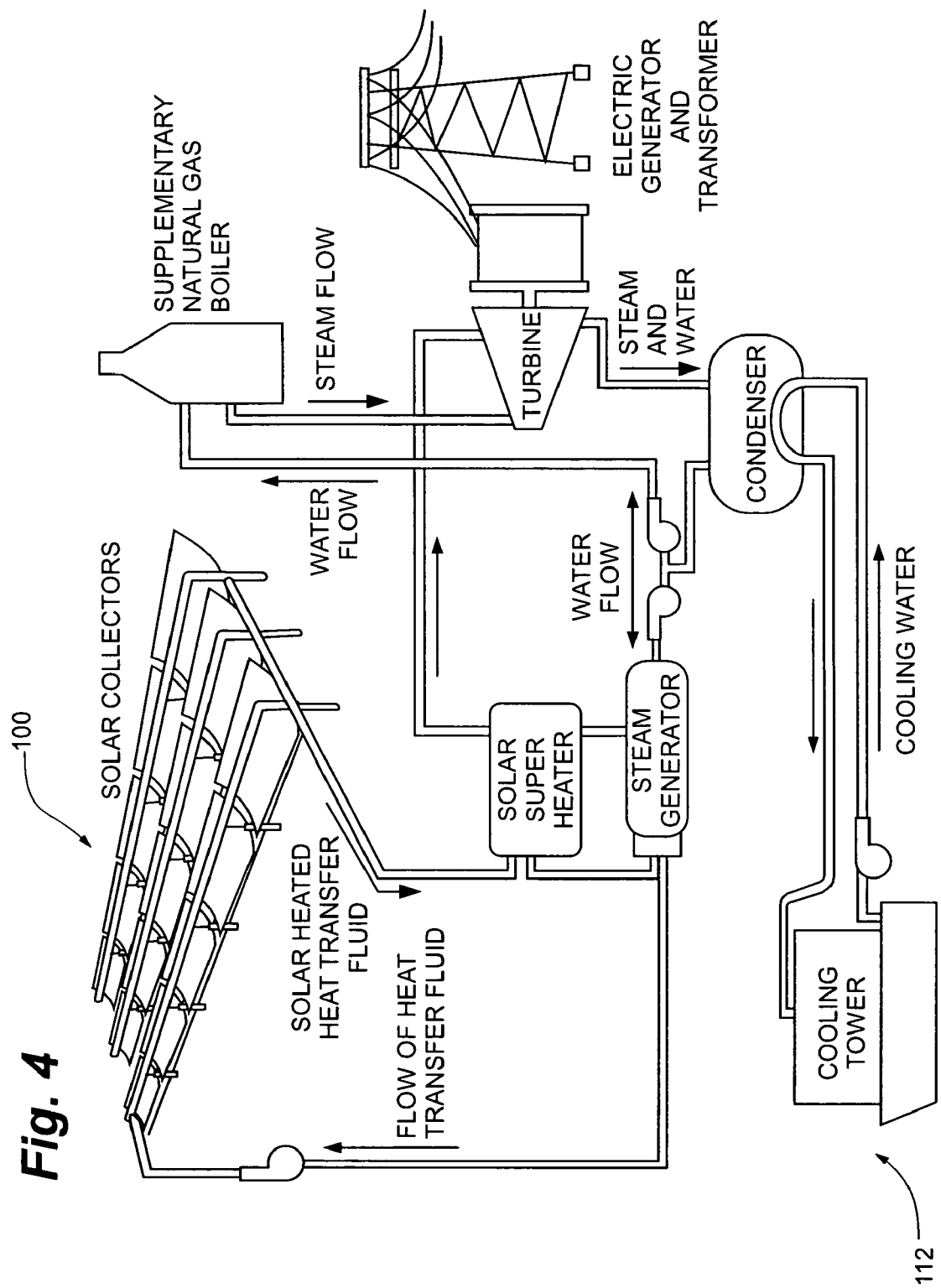
FIG. 4 is a schematic illustration of a CST system integrated into a power grid.
Figure 5:
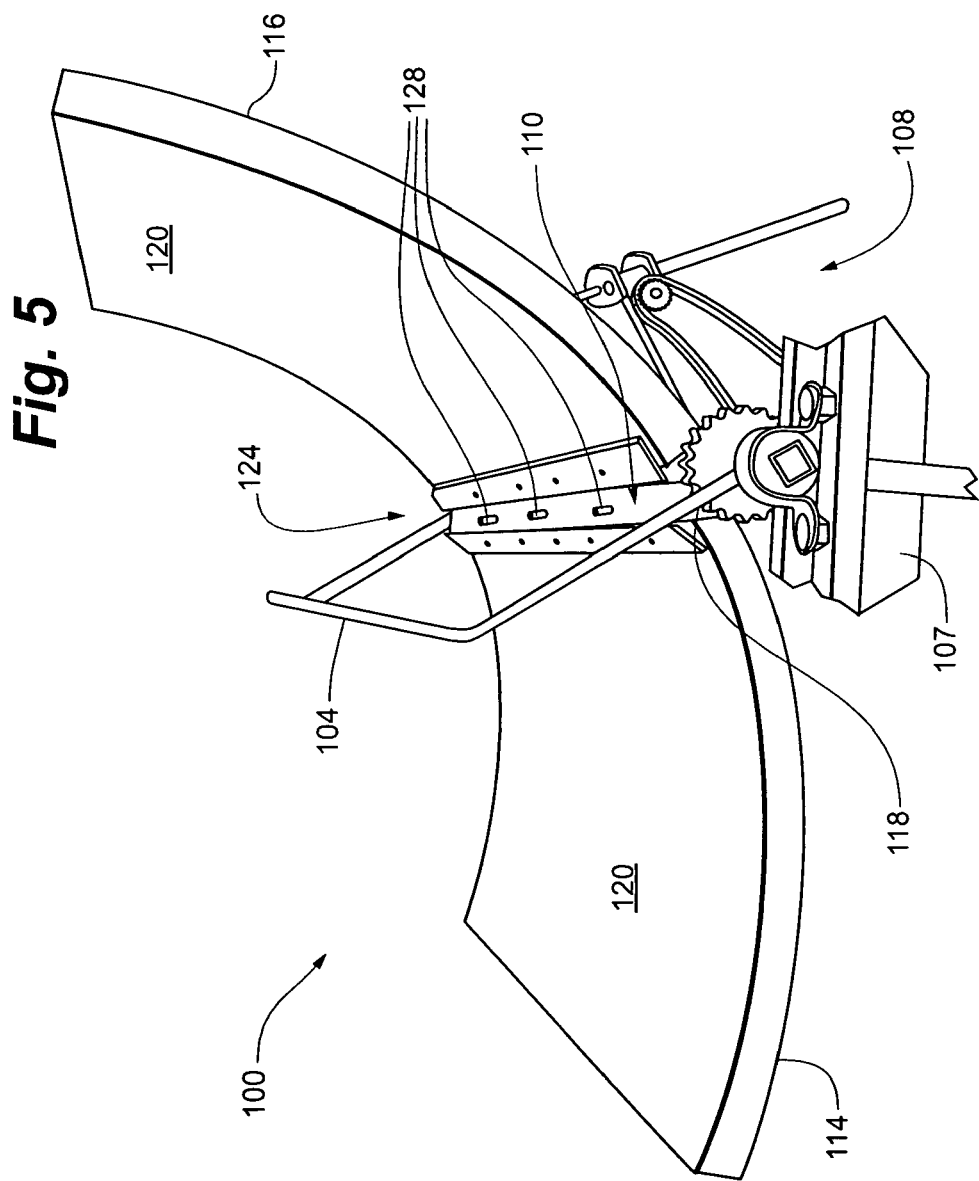
FIG. 5 is a perspective view of a solar collector according to an embodiment of the present invention.

A solar collector is depicted generally in FIG. 1 with reference numeral 100. As with other solar collectors known in the existing art, solar collector 100 comprises parabolic mirror 102, tube 104, rotating mechanism 106, and support structure 107, as depicted generally in FIGS. 1-3. Referring to FIGS. 5, solar collector 100 also generally comprises folding mechanism 108 and self-cleaning mechanism 110. A plurality of solar collectors 100 can be operably combined to form part of CST System 112, as depicted in FIG. 4. Solar collector 100 can generally reflect short-wavelength radiation $\lambda$ toward tube 104, as depicted in FIG. 3.

Figure 6:
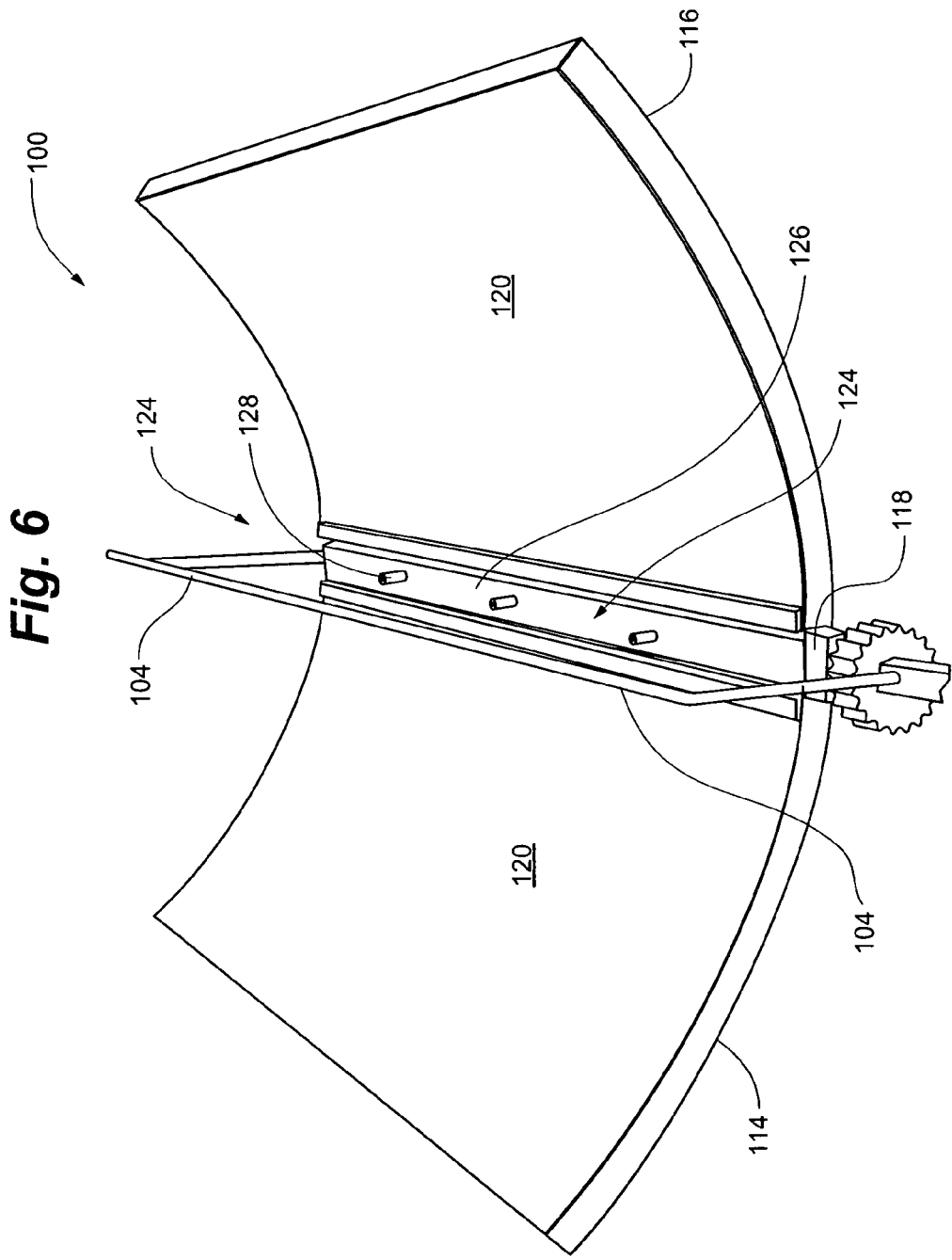
FIG. 6 is a perspective view of a solar collector according to an embodiment of the present invention.

Referring to FIGS. 5-6, parabolic mirror 102 comprises curved panels 114, 116 and hinge mechanism 118. In the embodiment of solar collector 100 shown in FIGS. 5-6, solar collector 100 has two panels 114, 116 forming a trough characterized by a rigid, substantially parabolic form. Any number of panels, however, could be used to form a solar collector 100 without departing from the spirit or scope of the present invention. The number of panels used may depend in part on the degree to which independent movement of the panels is desired by a designer or user of system 112.

Each panel 114, 116 have inside surface 120 and outside surface 122. In an example embodiment, inside surface 120 reflects sunlight, while outside surface 122 primarily provides structural support. Although inside and outside surfaces 120, 122 may be made from the same material, inside and outside surfaces 120, 122 are generally made from different materials. Inside surface 120 may, for example, be made from silver foil, coated silver, or polished aluminum, while outside surface may be made from steel.

Figure 13:
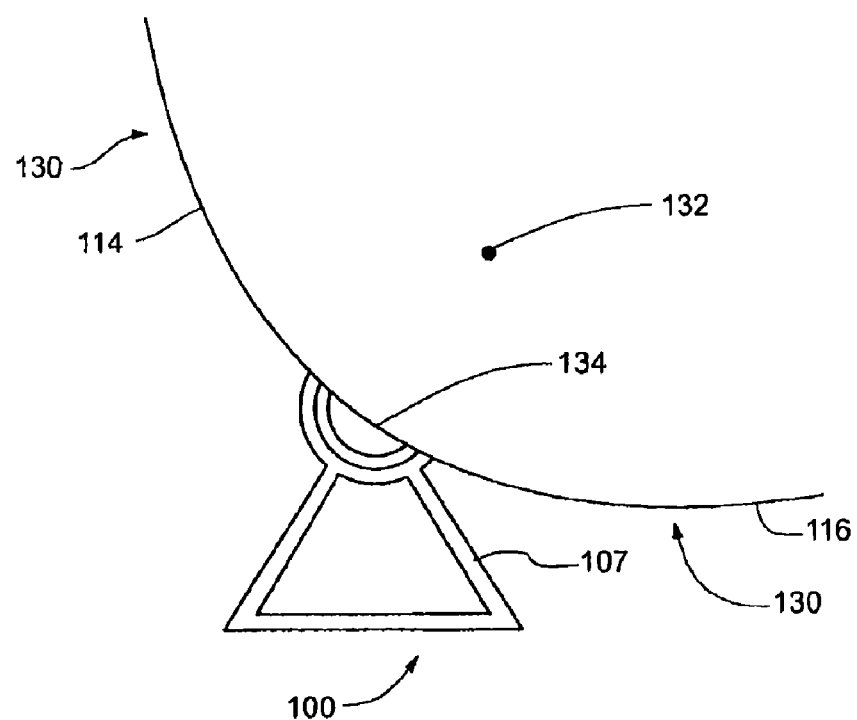
FIG. 13 is a cross-sectional view of a solar collector according to an embodiment of the present invention.

Panels 114, 116 may be any number of shapes and sizes. In an example embodiment, panels 114, 116 are shaped so as to be able to form a parabolic trough, as depicted in FIGS. 5-6 and 13. Panel 114 is generally constructed so to be substantially the same shape and size as panel 116. Therefore, panels 114, 116 are substantially mirror images of each other.

Figure 8:
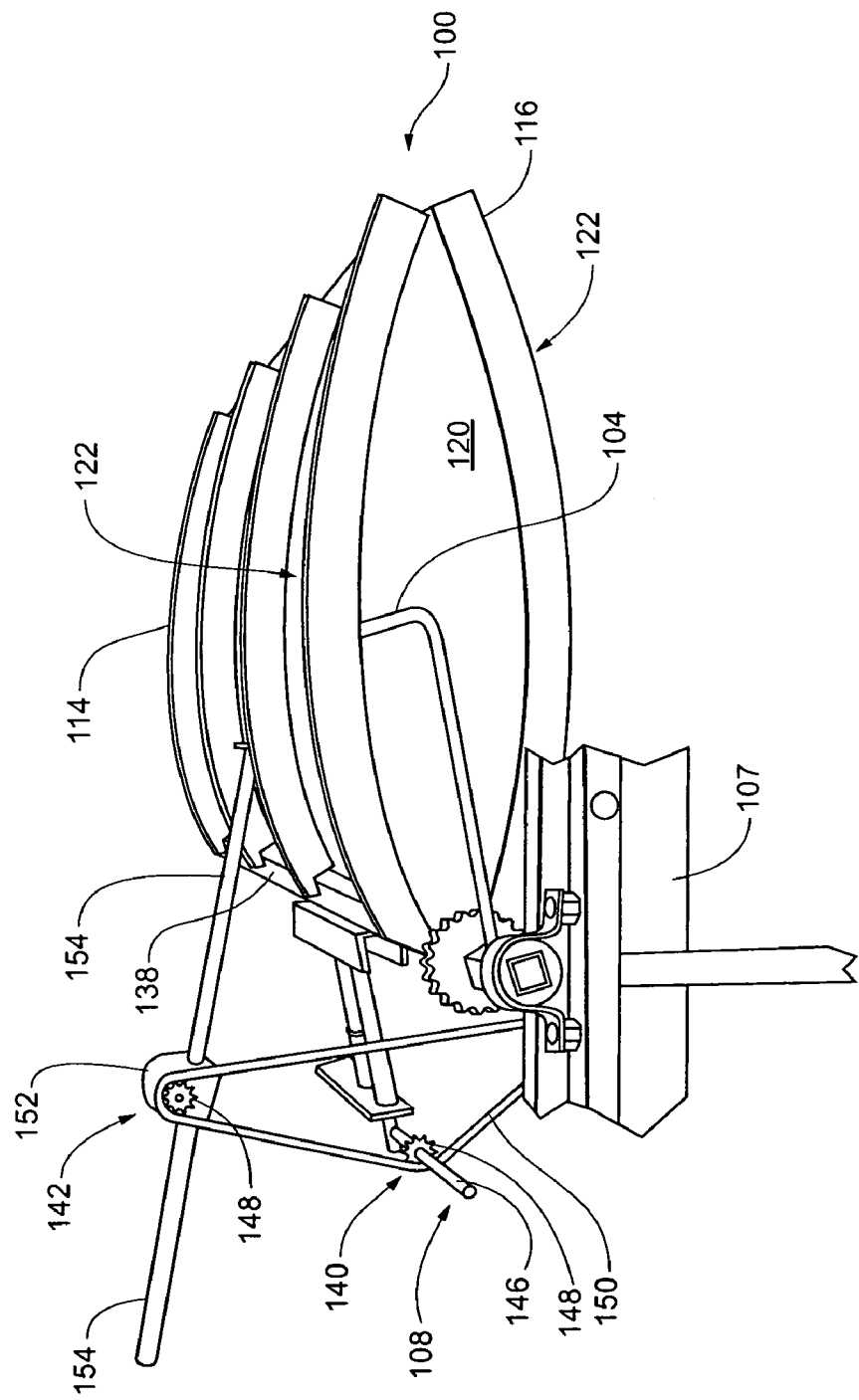
FIG. 8 is a perspective view of a solar collector according to an embodiment of the present invention.
Figure 9:
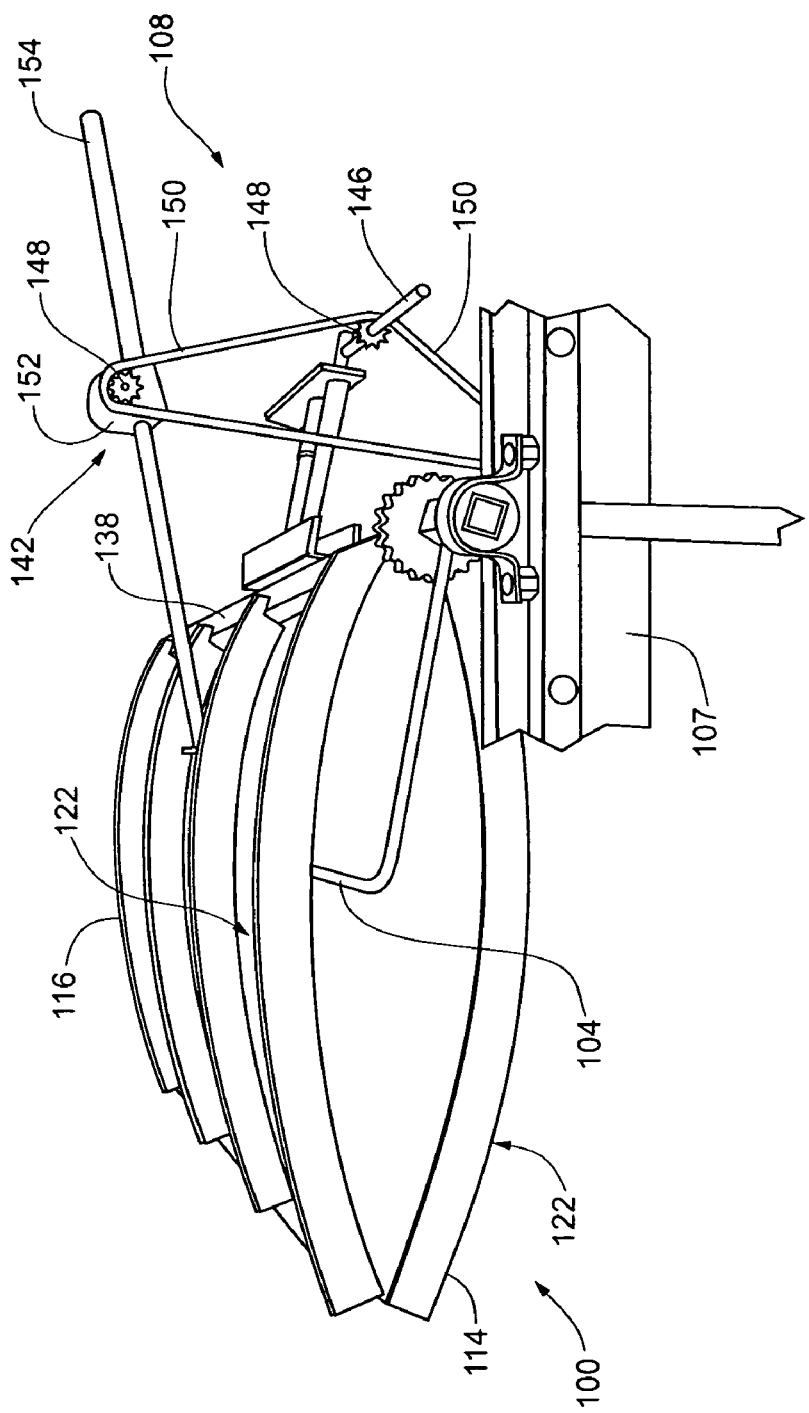
FIG. 9 is a perspective view of a solar collector according to an embodiment of the present invention.
Figure 10:
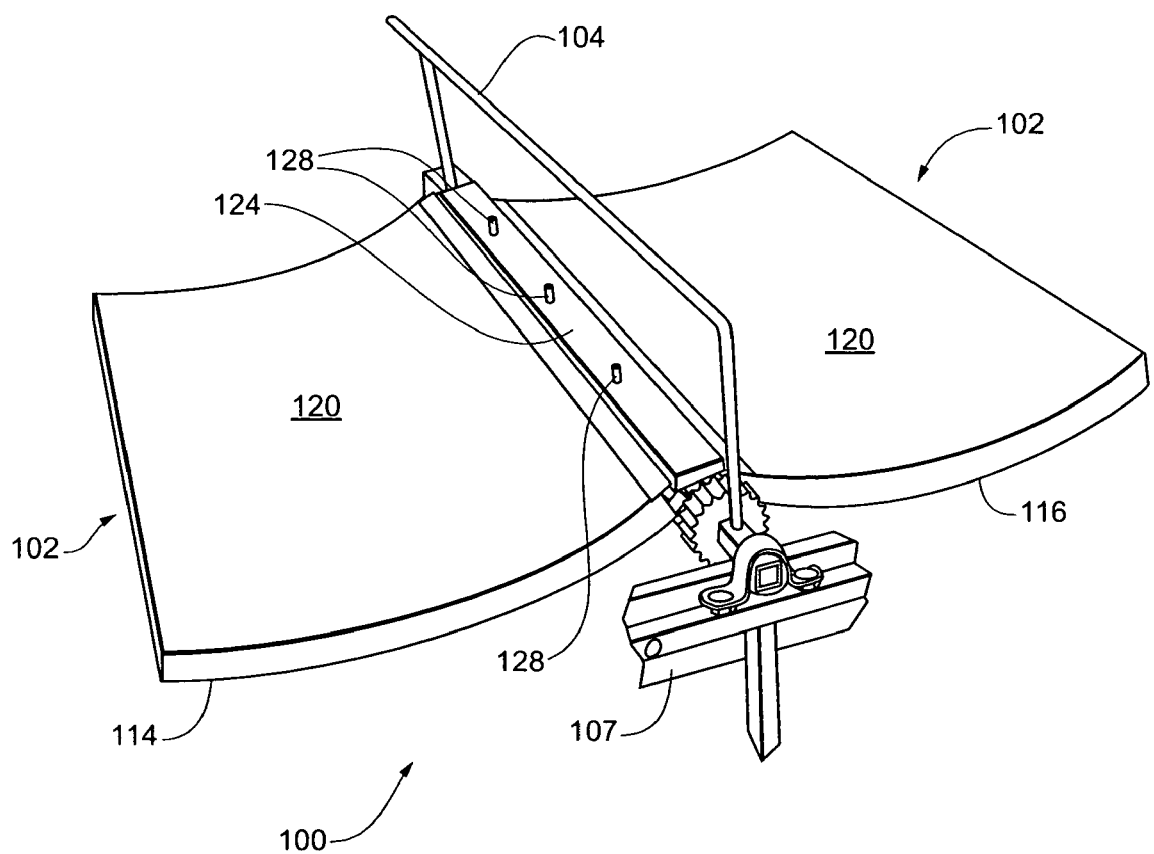
FIG. 10 is perspective view of a solar collector according to an embodiment of the present invention.

Panels 114, 116 are operably connected to hinge mechanism 118. In an example embodiment, hinge mechanism 118 is attached to outside surfaces 122 of panels 114, 116. Hinge mechanism 118 is adapted to permit panels 114, 116 be folded into a closed position, as depicted in FIGS. 7-9 and 16-17. Hinge mechanism 118 also permits panels 114, 116 to be unfolded into open position, as depicted in FIGS. 10 and 18. Hinge mechanism 118 can also hold panels 114, 116 together so that panels 114, 116 substantially form a continuous parabolic surface. To provide rotational clearance for the inner edges of panels 114, 116 during folding and unfolding, hinge mechanism 118 provides for gap 124 between panels 114, 116. Gap 124 ensures that panels 114, 116 do not interfere with each other while solar collector 100 is opened and closed.

Substantially covering gap 124 is self-cleaning system 110. Self-cleaning system 110 is depicted generally in FIGS. 5-6. Self-cleaning system 110 generally comprises reflective plate 126, nozzles 128, and collection mechanism (not shown). Reflective plate 126 houses nozzles 128 and reflects short-wavelength radiation $\lambda$. The reflective surface of reflective plate 126 is generally made from the same or similar materials as the reflective inner surfaces 120 of panels 114, 116, such as, for example, silver foil, coated silver, or polished aluminum. Although reflective plate 126 may be any number of shapes and sizes, the reflective plate 126 generally parabolically corresponds with panels 114, 116. In an example, embodiment, with reflective panel 126 over gap 124, panels 114, 116 can be positioned so that panels 114, 116 and reflective panel 126 substantially form a parabolic trough, as depicted in FIGS. 5-6.

Figure 7:
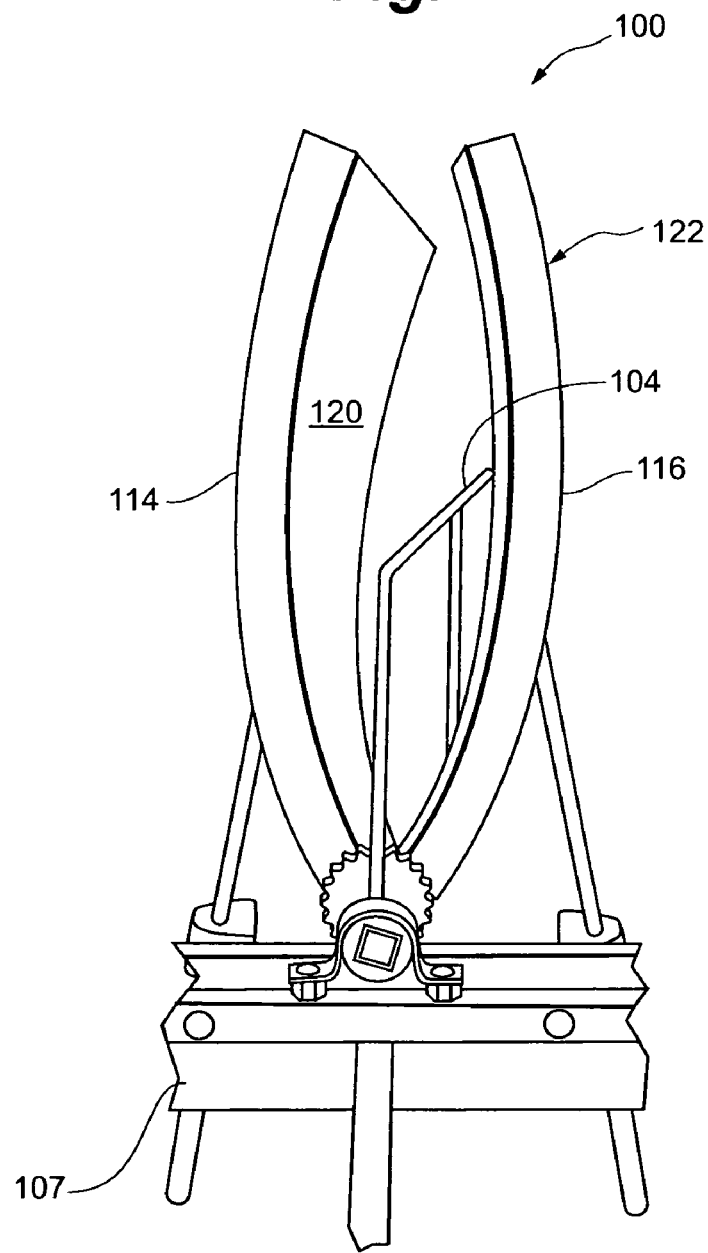
FIG. 7 is a perspective view of a solar collector according to an embodiment of the present invention.

Referring to FIGS. 5-6, nozzles 128 are generally positioned at systematic intervals and are adapted to spray a cleaning fluid. Nozzles 128 may exhibit any number of spray patterns. In an example embodiment, nozzles 128 generally exhibit a spray pattern capable of cleaning the inner surfaces 120 of panels 114, 116 when panels 114, 116 are folded into a closed position, as depicted in FIGS. 7-9. A collection mechanism (not shown) such as a pan or trough can be located underneath gap 124. The collection mechanism receives cleaning fluid falling through gap 124 and can redirect the cleaning fluid to nozzles 128.

Referring to FIGS. 5-10, solar collector 100 has tube 104. Tube 104 is generally positioned above reflective plate 126, as depicted in FIG. 5-10, and is adapted to accommodate the flow of fluid. In an example embodiment, tube is positioned along focal line 136 of the parabolic trough that can be formed by panels 114, 116. In an example embodiment, tube 104 is made from or coated with a material that facilitates the absorption of short-wavelength radiation $\lambda$. For example, tube 104 may be painted black or coated with black chrome. Referring to FIG. 3, a plurality of tubes 104 can be interconnected to form part of CST system 112.

Figure 14:
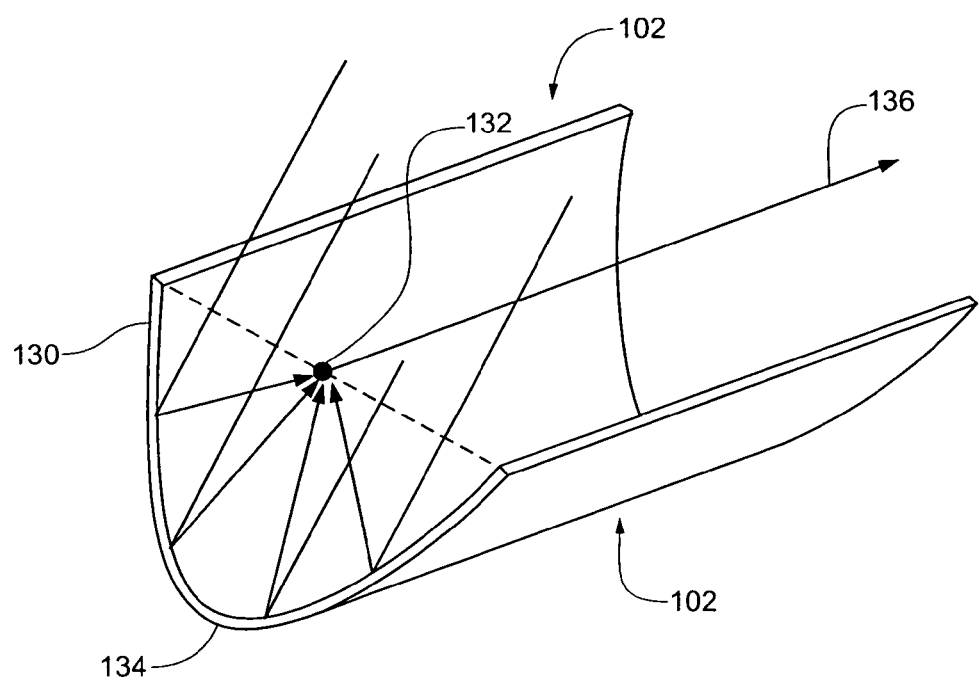
FIG. 14 is a perspective illustration of a parabolic trough formed by a solar collector according to an embodiment of the present invention.

As previously described, panels 114, 116 and reflective plate 126 can be positioned so that solar collector 100 forms a parabolic trough. Referring to FIG. 13, panels 114, 116 and reflective plate 126 can form parabola 130 in cross section. Parabola 130 is characterized by focal point 132 and vertex 134. Referring to the perspective view of parabolic solar collector 100 depicted in FIG. 14, solar collector 100 has focal line 136 running the length of panels 114, 116. In an example embodiment, tube 104 is located at and substantially follows focal line 136.

Figure 11:
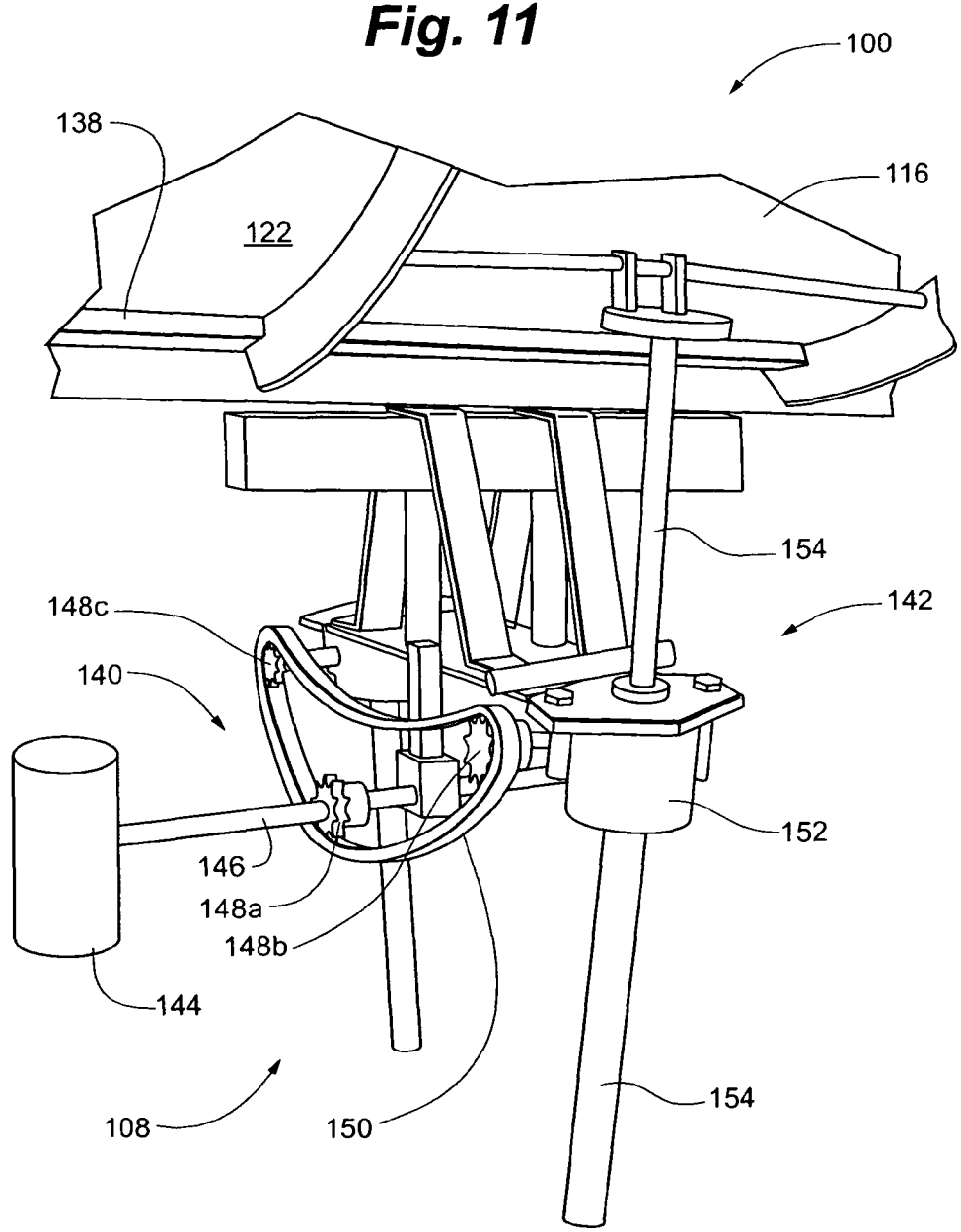
FIG. 11 is a perspective view of rotating and folding mechanisms of a solar collector according to an embodiment of the present invention.

Solar collector 100 has folding mechanism 108, as depicted in FIGS. 8-9 and 11. Folding mechanism 108 may be any number of mechanisms that allow panels 114, 116 to be folded and unfolded between closed and open positions. In an example embodiment, folding mechanism 118 comprises torque tube 138, drive train 140, lift arm 142, and motor 144. Torque tube 138 is attached to hinge mechanism 128. Torque tube 138 supports panels 114, 116 in a desired position, such as, for example, in a parabolic position. Referring to FIG. 11, drive train 140 is operably connected to lift arm 142 and motor 144. Drive train 140 generally has driveshaft 146, gears 148, and flexible linking member 150. Lift arm 142 has cam 152 and lifting bar 154. Lifting bar 154 is operably connected to the outside surface 122 of panel 114 or 116. Motor 144 may be any number of motors providing sufficient power to fold and unfold panels 114, 116 between the closed and open positions.

Figure 12:
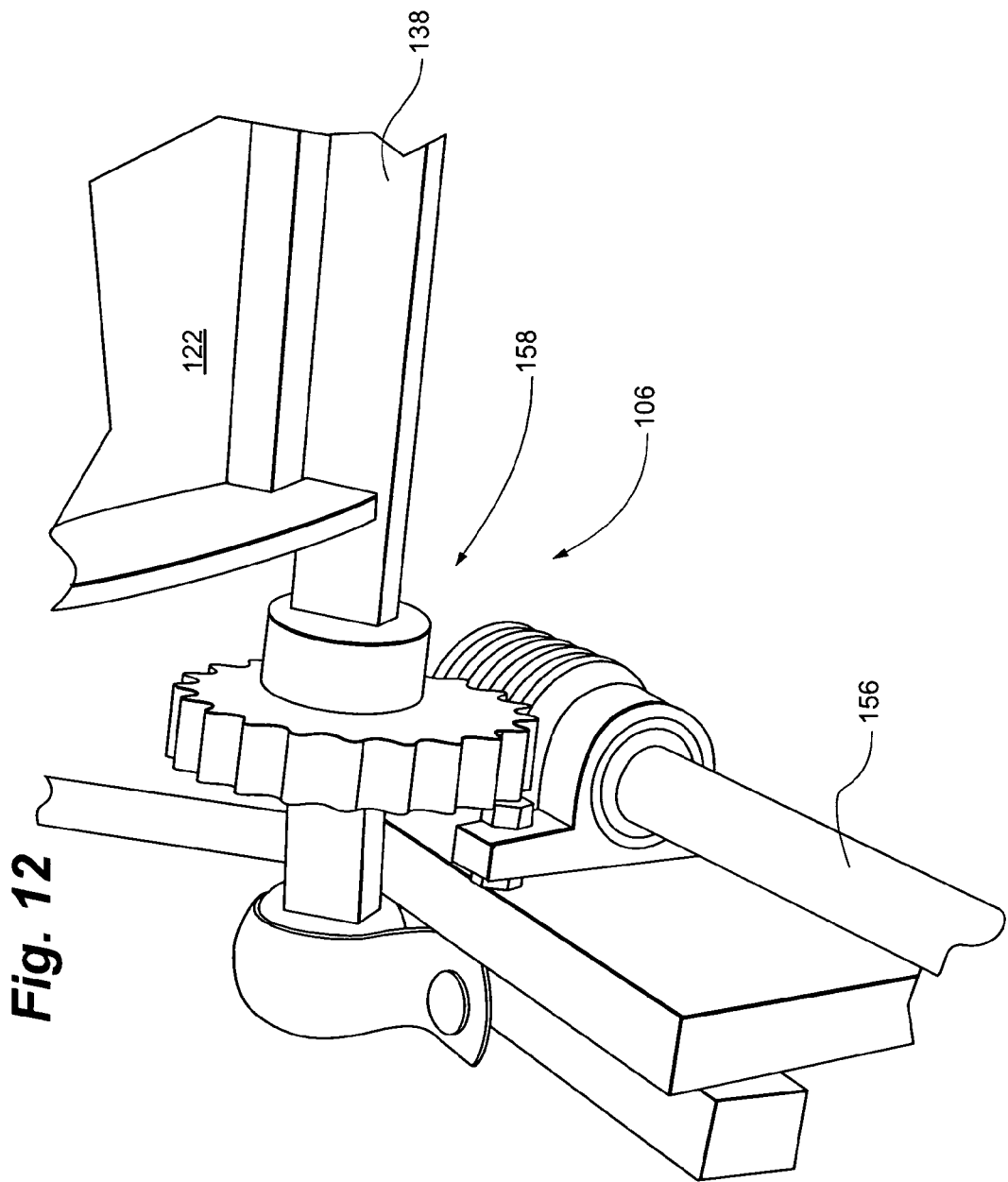
FIG. 12 is a perspective view of a rotating mechanism of a solar collector according to an embodiment of the present invention.

Solar collector 100 also has rotating mechanism 106, as depicted in FIG. 12. Rotating mechanism 106 may be any number of mechanisms that allow solar collector 100 to be rotated. In an example embodiment, rotating mechanism 106 comprises driveshaft 156, spiral gear 158, and a motor (not shown). Spiral gear 158 is operably connected to driveshaft 156 and the motor. The motor may be any number of motors providing sufficient power to rotate trough on support structure 107. Rotating mechanism 106 may also be operably connected to a control circuit or other device adapted to automatically track the sun. Although rotating mechanism 106 is preferably motorized and operably connected to a control circuit or device, rotating mechanism 106 could also be controlled manually by a user.

In operation, solar collector 100 and panels 114, 116 of solar collector 100 can be oriented in any number of positions in any number of ways by actuating folding mechanism 108 or rotating mechanism 106. Generally, folding mechanism 108 individually or simultaneously positions panels 114, 116 between open and closed positions, including into a parabolic position. Referring to FIG. 5-6, panels 114, 116 are oriented in a parabolic position. Referring to FIGS. 7-9, panels are oriented in a closed position. Referring to FIG. 10, panels 114, 116 are oriented in an open position. Generally, rotating mechanism 106 rotates solar collector 100 so that panels 114, 116 simultaneously travel along the same path. For example, rotating mechanism 106 can rotate solar collector 100 with panels 114, 116 in a parabolic position to track the sun. With panels 114, 116 in a closed position, rotating mechanism 106 can rotate solar collector between an upright position, as depicted in FIG. 7, and sideways positions, as depicted in FIGS. 8-9.

Rotating mechanism 106 can rely upon any number of methods or devices known in the art to rotate solar collector 100. In an example embodiment, actuation of a motor (not shown) rotates driveshaft 156. Rotation of driveshaft 156 causes spiral gear 158 to effectuate rotation of torque tube 138. Since panels 114, 116 are rigidly attached to torque tube 138, rotation of torque tube 138 cause panels 114, 116 to rotate along the same path.

One skilled in the art will recognize that rotating mechanism 106 can be operated either manually or automatically without departing from the spirit or scope of the present invention. In an embodiment, rotating mechanism 106 incorporates a control system to time the adjustment of solar collector 100 in relation to movement of the sun. In an embodiment, the control system has a sensor that is responsive to the presence or absence of visible light. The sensor is operably connected to the control system and may be programmable. The control system, in turn, is operably connected to rotating mechanism 106 so that the control system can direct the position of panels 114, 116. For example, the sensor may be active during periods programmed into the control system, such as those times of day when collectable short-wavelength radiation k can be expected.

In an embodiment, the control system is controlled by a microprocessor and is communicatively connected to a Global Positioning Satellite (GPS) device. The control system receives information from the GPS device. This information may include the position of the sun, the time of day, and/or the time of year. Other sensors may also be included in the control system to obtain and/or relay information regarding weather patterns, local sunrise and sunset, geographical location, environmental conditions, and/or historical use of solar collector 100. In an embodiment, the control system is programmed with an algorithm predictive of the sun's position based upon some or all of this information. Solar collector 100 can thereby be adjusted so as to be oriented toward the sun at different times of day or during different types of environmental conditions.

The control system can be pre-programmed with the desired algorithm, or can be programmed based upon the preferences of a user. In an embodiment, the control system can be controlled remotely, such as by a computer, mobile phone, PDA, or other handheld device. Operation of the remote controller may be by a physical connection (such as a cable or wire) or a wireless connection, such as, for example, by way of an antenna (not shown) communicatively connected to the control system.

Folding mechanism 108 can rely upon any number of methods or devices known in the art to position panels 114, 116. In an example embodiment, actuation of a motor 144 rotates driveshaft 146. Rotation of drive shaft 146 causes rotation of gear 148a to be rotated. Rotation of gear 148a drives flexible linking member 150. Flexible linking member 150 may be any number of components, such as, for example a chain or a belt. As flexible linking member 150 is engaged, gears 148b, 148c are rotated. Rotation of gear 148b actuates cam 152. Actuation of cam 152 axially drives lift arm 154. Since lift arm 154 is attached to panel 116, axial movement of lift arm 154 causes panel 116 to move. Since the rotational direction of driveshaft 146 is reversible by motor 144, lift arm 154 can be operated so as to reversibly open or close panel 116.

Although not shown, folding mechanism 108 can also be adapted to actuate panel 114. For example, gear 148c could be operably connected to a second cam that axially drives a second lift arm 154 attached to panel 114. The outer edges of panels 114, 116 can thereby be brought together in a manner similar to the closing of a clamshell. Alternatively, motor 144 could actuate a second driveshaft, and a second folding mechanism could be operably connected to panel 114 so that panel 114 can be opened and closed independently of panel 116. Motor 144 of folding mechanism 108 may be the same or different than the motor of rotating mechanism (not shown). In an example embodiment, folding mechanism 108 and rotating mechanism 106 use separate motors.

One skilled in the art will recognize that folding mechanism 108, like rotating mechanism 106, can be operated either manually or automatically without departing from the spirit or scope of the present invention. In an embodiment, rotating mechanism 106 incorporates a programmable control system that allows rotating mechanism to be automatically and manually actuated. In this manner, panels 114, 116 of solar collector 100 can be positioned in a closed, or storage, position when not in use and positioned so as to minimize damage the mirrored inner surface 120 of panels 114, 116 or to the overall structure of solar collector 100.

Figure 15:
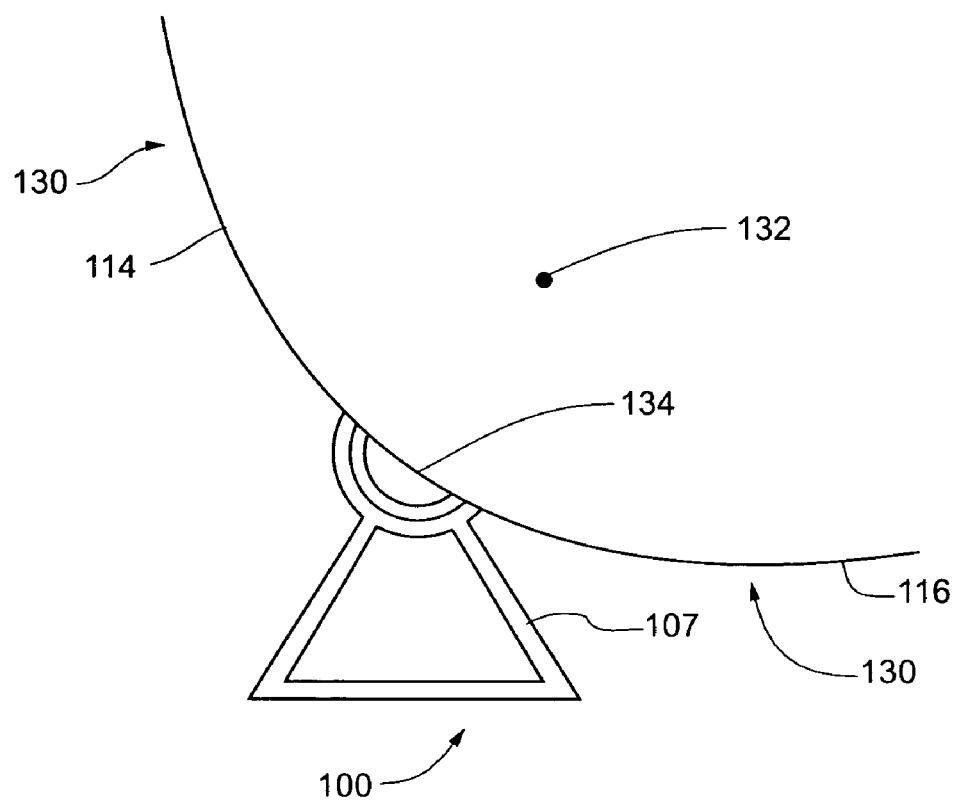
FIG. 15 is a cross-sectional illustration of a parabolic trough formed by a solar collector according to an embodiment of the present invention.

Referring to FIGS. 5-6, panels 114, 116 of solar collector 100 are positioned in a parabolic position. In the parabolic position, panels 114, 116 and reflective plate 126 substantially form a parabolic trough such that tube 104 runs through focal line 136. Referring to FIG. 15, in the parabolic position, solar collector 100 is able to concentrate short-wavelength radiation $\lambda$, such as sunlight, onto tube 104. Specifically, incoming short-wavelength radiation $\lambda_1$ strikes inside surface 120 of parabolic mirror 102. Due to the parabolic shape of mirror 102, incoming short-wavelength radiation $\lambda_1$ is redirected to tube 104 as reflected short-wavelength radiation $\lambda_2$. Even though short-wavelength radiation $\lambda$ may approach solar collector 100 from different angles, the parabolic position of panels 114, 116 allows solar collector 100 to concentrate short-wavelength radiation $\lambda$ onto tube 104.

Referring to FIG. 10, panels 114, 116 of solar collector 100 are positioned in an open position. In the open position, panels 114, 116 lie in a plane that is generally perpendicular to the incidence of short-wavelength radiation $\lambda$. Referring to FIG. 18, in the open position, panels 114, 116 can reflect short-wavelength radiation $\lambda$. Specifically, incoming short-wavelength radiation $\lambda_1$ strikes inside surface 120 of parabolic mirror 102. Due to the orientation of panels 114, 116 in the open position, short-wavelength radiation $\lambda$ is redirected back into space as reflected short-wavelength radiation $\lambda_2$. In the open position, up to approximately ninety-eight percent of incoming short-wavelength radiation $\lambda_1$ can be redirected into space as reflected short-wavelength radiation $\lambda_2$.

By redirecting incoming short-wavelength radiation $\lambda_1$ into space as reflected short-wavelength radiation $\lambda_2$, solar collector 100 can prevent reflected short-wavelength radiation $\lambda_2$ from being absorbed by the local environment and converted to long-wavelength or blackbody radiation. Generally, incoming short-wavelength radiation $\lambda_1$ that has reached the reflective surfaces of panels 114, 116 comprises wavelengths that have not been absorbed by the atmosphere (such as, for example, by "greenhouse" gases, such as carbon dioxide and methane), and will thus not be absorbed by the atmosphere if immediately redirected through the atmosphere back to outer space as reflected short-wavelength radiation $\lambda_2$.

Referring to FIGS. 7-9, panels 114, 116 of solar collector 100 are positioned in a closed position. In the closed position, panels 114, 116 substantially surround tube 104. With panels 114, 116 positioned in the closed position, solar collector 100 can be positioned in an upright position, as depicted in FIG. 7, or in a sideways position, as depicted in FIGS. 8-9. Although not shown, solar collector 100 can be positioned in any number of positions between the upright and sideways positions when panels 114, 116 are in the closed position.

With panels 114, 116 positioned in the closed position, outer surfaces 122 generally aid in the protection of inner surfaces 120, which may be lined with a delicate reflective material or finish such silver foil, coated silver, or polished aluminum. For example, in the absence of direct sunlight, such as at night or under prolonged cloud cover, solar collector 100 may not be able to concentrate sufficient short-wavelength radiation X onto tube 104 to generate electricity. In such instances, it may be desirable to store solar collector 100 for an extended period of time. During this time, outer surfaces 122 of panels 114, 116 can substantially protect inner surfaces 120 of panels 114, 116 from unwanted deposits such as hail, dust, and animal droppings.

In the upright position with panels 114, 116 closed, the cleaning efficiency of self-cleaning mechanism 110 can also be enhanced. Generally, self-cleaning mechanism 110 delivers cleaning fluid, such as water or a diluted solvent, to nozzle 128. Since the area of the exit opening of nozzle 128 is generally less that the cross-sectional area of the vessel delivering the cleaning fluid to nozzle 128, the pressure of the cleaning fluid will be increased as it exits nozzle 128. This increased pressure helps in removing unwanted deposits on inner surface 120 of mirror 102. In an example embodiment, solar collector 100 can orient in the upright position with panels 114, 116 being closed during cleaning. Inner surfaces 120 of panels 114, 116 are thereby brought into closer proximity to nozzles 128. With solar collector 100 in the upright position, gravity is also able to assist the cleaning process. Specifically, residual cleaning fluid can drip down inner surfaces 120 of panels 114, 116, thereby further removing unwanted deposits. In addition, residual cleaning fluid can pass through gap 124 and be recycled through self-cleaning mechanism 110 for repeated application to inner surfaces 120.

Figure 16:
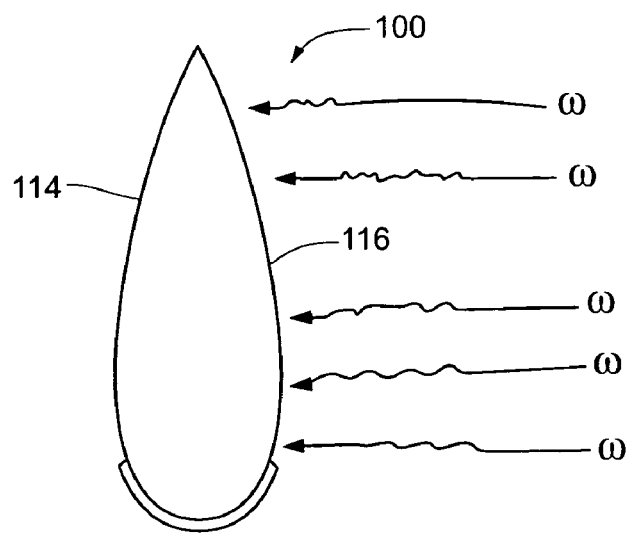
FIG. 16 is a cross-sectional illustration of a parabolic trough according to an embodiment of the present invention.

In certain instances, it may be desirable to have panels 114, 116 in a closed position but not have solar collector 100 in an upright position, such as during extreme weather. During high winds, for example, particulate matter may travel at sufficiently high velocities to cause significant damage to inner surfaces 120 of mirror 102. Positioning panels 114, 116 of solar collector 100 in an upright position for protective purposes, however, exposes a large surface area upon which wind co can exert a force, as depicted in FIG. 16. This force, in turn, can damage solar collector by causing collapse or structural fatigue.

Figure 17:
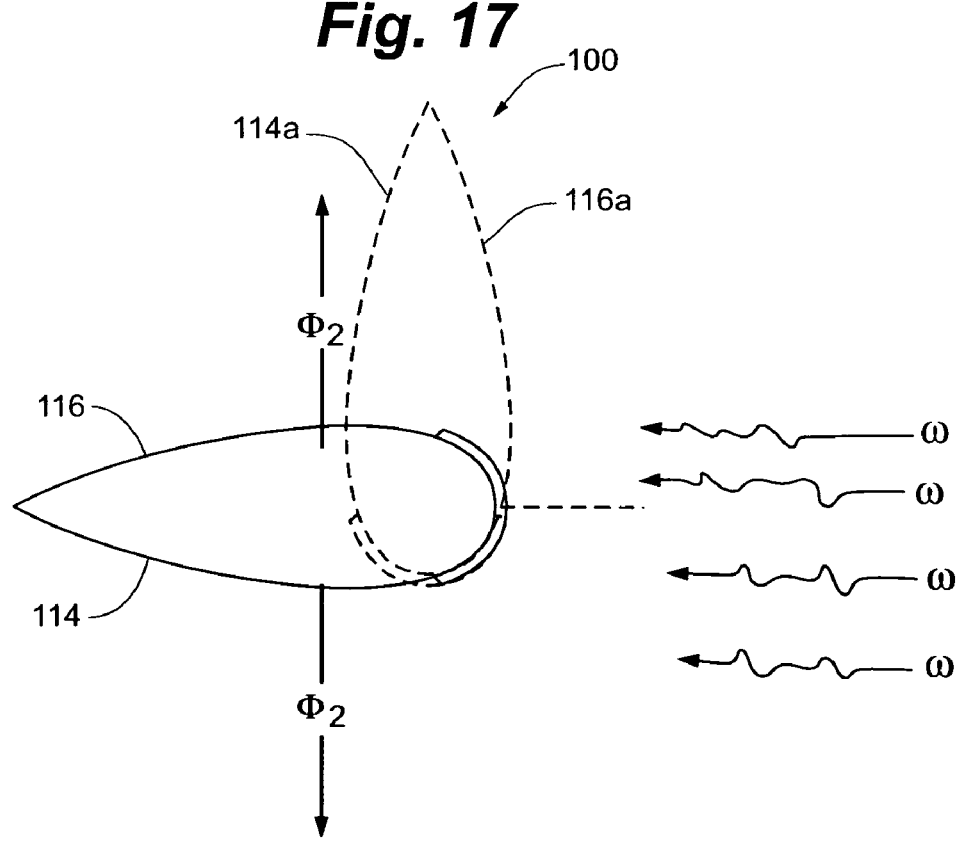
FIG. 17 is a cross-sectional illustration of a parabolic trough according to an embodiment of the present invention.

In an example embodiment, solar collector 100 can be oriented in a sideways position with panels 114, 116 closed to decrease potential damage due to adverse environment conditions. Specifically, solar collector 100 can be oriented such that panels 114, 116 are substantially parallel with the direct of wind ω, as depicted in FIG. 17. By rotating solar collector 100 from the upright position to a sideways position, the shape of panels 114, 116 can more effective deflect wind ω. With solar collector 100 oriented in a sideways position parallel to the direction of wind ω, panels 114, 116 can also create a cancelling pressure differential. Specifically, outer surfaces 122 of panels 114, 116 are configured so as to act as air foils. As high winds pass over the outer surfaces 122, resulting areas of low pressure create "negative lift" forces $\Phi_1$, $\Phi_2$ that tend to offset each other. By creating opposing forces $\Phi_1$, $\Phi_2$ that substantially cancel each other out, the sideways position can thereby stabilize solar collector 100 in high winds.

It will be appreciated by one skilled in the art that panels 114, 116 and solar collector 100 can be positioned into any number of positions other than those shown without departing from the spirit or scope of the present invention. For example, an orientation between the upright and sideways positions may be useful when incident winds ω or airborne contaminants and particulates are moving in directions intermediate horizontal or vertical directions. Alternatively, panels 114, 116 can be positioned independently as desired. For example, panel 114 can be positioned in a parabolic position so to redirect incoming short-wavelength radiation $\lambda_1$ to tube 104 as reflected short-wavelength radiation $\lambda_2$, while panel 116 can be oriented into an open position so as to redirect incoming short-wavelength radiation $\lambda_1$ into space as reflected short-wavelength radiation $\lambda_2$, or vice versa. Other reasons for alternative positioning include cleaning, maintenance, or the avoidance of local obstructions, whether temporarily or for an extended period of time.

In operation, solar collector 100 may be employed as part of a system or method to help maintain an approximate balance between solar radiation received by the earth and solar radiation redirected to space. An imbalance will cause the total amount of radiation retained to either increase or decrease. When an imbalance results from excessive conversion of incident shortwave radiation to long-wavelength radiation, the localized temperature, and ultimately the temperature of the earth, will increase progressively. Because short-wavelength radiation $\lambda$ from the sun is converted to long-wavelength blackbody radiation after absorption by the earth, solar collector 100 can be used to stop some amount of short-wavelength radiation $\lambda$ from being converted and thus play a role in reducing undesirable localized heating.

When configured to assume an open position for redirecting short-wavelength radiation $\lambda$ to space, solar collector can thereby be used as part of a system or method for reducing local temperatures, and thus the need for cooling equipment, with a concomitant reduction in consumption of energy. Moreover, redirection of short-wavelength radiation $\lambda$ by way of solar collector 100 does not add carbon dioxide, methane, or water vapor to the atmosphere, all of which are known to block transmission of long wavelength radiation back to space. Therefore, solar collector 100 can be used as part of a system or method to reduce imbalances between absorption and redirection of solar energy on both a local and global scale.

A device, method, or system incorporating features described herein may be used for collecting solar energy and for rejecting short-wavelength radiation $\lambda$ back to space by positioning panels 114, 116 in various configurations. For example, one or more solar collectors 100 could be installed on large buildings to gather heat during cold weather, but also made capable of rejecting short-wavelength radiation λ to reduce the consumption of energy by air conditioners during warm weather.

Deployment of solar collector 100, whether in single units, units spaced in close proximity to each other, or units spaced apart may also be part of a large-scale system or method to offset the effects of climate change. If large amounts of short-wavelength radiation λ from the sun are sent back into space before heating the structures or the earth proximate solar collector 100, localized buildup of heat from solar insolation can be reduced, thus effectively cooling buildings or other localized zones proximate solar collector 100 and also tending to reduce the ability of increasing "greenhouse" gases in the atmosphere to contribute to climate change.

The invention claimed is.

1. A solar collector for redirecting solar radiation, the solar collector comprising:
- a first reflective panel having a first reflective panel inner surface for reflecting solar radiation and a first reflective panel outer surface, the first reflective panels shiftable between first and second folding positions with respect to an axis of rotation;
- a second reflective panel having a second reflective panel inner surface for reflecting solar radiation and second reflective panel outer surface, the second reflective panel shiftable between first and second folding positions with respect to the axis of rotation;
- a first lift arm operably coupled to the first reflective panel;
- a second lift arm operably coupled to the second reflective panel;
- a first actuator operably coupled to the first lift arm, the first actuator operable to provide infinitely adjustable positioning of the first reflective panel from the first folding position to the second folding position and further operable to substantially secure the first reflective panel in the first folding position, the second folding position, and infinite positions between the first and second folding positions;
- a second actuator operably coupled to the second lift arm, the second actuator operable to provide infinitely adjustable positioning of the second reflective panel from the first folding position to the second folding position and further operable to substantially secure the second reflective panel in the first folding position, the second folding position, and infinite positions between the first and second folding positions;
- a third actuator operably coupled to the first and second reflective panels, the third actuator operable to substantially simultaneously rotate the first and second reflective panels about the axis of rotation from a first rotational position to a second rotational position and further operable to substantially secure the first and second reflective panels in the first rotational position, the second rotational position, and infinite positions intermediate the first and second rotational positions;
- wherein the first and second reflective panels are configured to form a substantially parabolic trough in a parabolic position intermediate the first and second folding positions, the parabolic trough presenting a focus line.

2. The solar collector of claim 1, wherein each of the first and second reflective panels redirects solar radiation toward the axis of rotation in the parabolic position.

3. The solar collector of claim 1, wherein the first, second, and third actuators are independently operable.

4. The solar collector of claim 1, wherein the first and second reflective panels are positioned substantially around the axis of rotation in the second folding position.

5. The solar collector of claim 1, wherein the first lift arm is coupled to the first reflective panel outer surface and the second lift arm is coupled to the second reflective panel outer surface.

6. The solar collector of claim 1, wherein the first and second panels redirect solar radiation into space in the first folding position.

7. The solar collector of claim 1, wherein the the first and second actuators are simultaneously operable.

8. The solar collector of claim 1, wherein the the third actuator is operably to rotate the first and second reflective panels approximately 360 degrees about the axis of rotation.

9. The solar collector of claim 1, wherein each of the first and second actuators comprises a motorized driveshaft operably coupled to the first and second lift arms, respectively.

10. The solar collector of claim 1, further comprising means for cleaning the inner surfaces of the first and second reflective panels.

11. The solar collector of claim 1, wherein the first, second, and third actuators are simultaneously operable.

12. A system for generating electricity, the system comprising:
- a first reflective panel having a first reflective panel inner surface for reflecting solar radiation and a first reflective panel outer surface, the first reflective panel shiftable between first and second folding positions with respect to an axis of rotation;
- a second reflective panel having a second reflective panel inner surface for reflecting solar radiation and second reflective panel outer surface, the second reflective panel shiftable between first and second folding positions with respect to the axis of rotation;
- a first lift arm operably coupled to the first reflective panel;
- a second lift arm operably coupled to the second reflective panel;
- a first actuator operably coupled to the first lift arm, the first actuator operable to provide infinitely adjustable positioning of the first reflective panel from the first folding position to the second folding position and further operable to substantially secure the first reflective panel in the first folding position, the second folding position, and infinite positions between the first and second folding positions;
- a second actuator operably coupled to the second lift arm, the second actuator operable to provide infinitely adjustable positioning of the second reflective panel from the first folding position to the second folding position and further operable to substantially secure the second reflective panel in the first folding position, the second folding position, and infinite positions between the first and second folding positions;
- a third actuator operably coupled to the first and second reflective panels, the third actuator operable to substantially simultaneously rotate the first and second reflective panels about the axis of rotation from a first rotational position to a second rotational position and further operable to substantially secure the first and second reflective panels in the first rotational position, the second rotational position, and infinite positions intermediate the first and second rotational positions; and
- a generator;
- wherein the first and second reflective panels are configured to form a substantially parabolic trough in a parabolic position intermediate the first and second folding positions, the parabolic trough presenting a focus line.

13. The system of claim 12, wherein each of the first and second reflective panels redirects solar radiation toward the axis of rotation in the parabolic position.

14. The system of claim 13, further comprising:
a tube positioned substantially at the axis of rotation, the tube containing a fluid; and
a conduit system configured to deliver the fluid to the generator.

15. The system of claim 12, wherein the third actuator is automatically rotatable to optimize solar redirection by the first and second reflective panels.

16. The system of claim 12, wherein the first, second, and third actuators are independently operable.

17. A method of positioning a solar collector having a tube, the method comprising the step of:
actuating a first actuator to shift a first reflective panel between first and second folding positions with respect to an axis of rotation;
substantially securing the first reflective panel in the second folding position with the first actuator;
actuating a second actuator to shift a second reflective panel between first and second folding positions with respect to the axis of rotation;
substantially securing the second reflective panel in the second folding position with the second actuator;
actuating a third actuator to substantially simultaneously rotate each of the first and second reflective panels about the axis of rotation from a first rotational position to a second rotational position; and
substantially securing each of the first and second reflective panels in the second rotational position with the second actuator.

18. The method of claim 17, further comprising:
actuating the first and second actuators to position the first and second reflective panels, respectively, in a parabolic position wherein the first and second reflective panels form a parabolic trough, the parabolic position intermediate the first folding position and the second folding position; and
substantially securing the first and second reflective panels in the parabolic position with the first and second actuators, respectively.

19. The method of claim 18, further comprising:
actuating the third actuator to substantially simultaneously shift the first and second reflective panels from the second rotational position to a third rotational position while the first and second reflective panels substantially remain in the parabolic position.

20. The method of claim 17, further comprising:
independently actuating the first and second actuators.

21. The method of claim 18, further comprising
redirecting solar radiation into space when the first and second reflective panels are in the second folding positions.

* * * * *